United States Patent
Yoshida et al.

(10) Patent No.: US 9,083,057 B2
(45) Date of Patent: Jul. 14, 2015

(54) METHOD FOR PRODUCING NONAQUEOUS-ELECTROLYTE BATTERY AND NONAQUEOUS-ELECTROLYTE BATTERY

(75) Inventors: Kentaro Yoshida, Itami (JP); Kazuhiro Goto, Itami (JP); Ryoko Kanda, Itami (JP); Tomoharu Takeyama, Itami (JP)

(73) Assignee: SUMITOMO ELECTRIC INDUSTRIES, LTD., Osaka-shi, Osaka (JP)

(*) Notice: Subject to any disclaimer, the term of this patent is extended or adjusted under 35 U.S.C. 154(b) by 199 days.

(21) Appl. No.: 13/976,152

(22) PCT Filed: Dec. 28, 2011

(86) PCT No.: PCT/JP2011/080452
§ 371 (c)(1),
(2), (4) Date: Jun. 26, 2013

(87) PCT Pub. No.: WO2012/091111
PCT Pub. Date: Jul. 5, 2012

(65) Prior Publication Data
US 2013/0273438 A1 Oct. 17, 2013

(30) Foreign Application Priority Data

Dec. 28, 2010 (JP) .................................. 2010-292534
Nov. 11, 2011 (WO) .................. PCT/JP2011/076046

(51) Int. Cl.
- *H01M 10/0562* (2010.01)
- *H01M 10/052* (2010.01)
- *H01M 10/0585* (2010.01)
- *H01M 10/04* (2006.01)

(52) U.S. Cl.
CPC .......... *H01M 10/0562* (2013.01); *H01M 10/04* (2013.01); *H01M 10/052* (2013.01); *H01M 10/0585* (2013.01); *H01M 2300/0068* (2013.01); *Y02E 60/122* (2013.01)

(58) Field of Classification Search
None
See application file for complete search history.

(56) References Cited

FOREIGN PATENT DOCUMENTS

| JP | 2000-340255 A | 12/2000 |
|---|---|---|
| JP | 2003-077529 A | 3/2003 |
| JP | 2004-185862 A | 7/2004 |
| JP | 2008-103287 A | 5/2008 |
| JP | 2008-103289 A | 5/2008 |
| JP | 2008-112661 A | 5/2008 |

(Continued)

*Primary Examiner* — Patrick Ryan
*Assistant Examiner* — Wyatt McConnell
(74) *Attorney, Agent, or Firm* — Drinker Biddle & Reath LLP

(57) ABSTRACT

A positive-electrode body 1 is prepared that includes a positive-electrode active-material layer 12 including a powder-molded body, and a positive-electrode-side solid-electrolyte layer (PSE layer) 13 that is amorphous and formed on the positive-electrode active-material layer 12 by a vapor-phase process. A negative-electrode body 2 is prepared that includes a negative-electrode active-material layer 22 including a powder-molded body, and a negative-electrode-side solid-electrolyte layer (NSE layer) 23 that is amorphous and formed on the negative-electrode active-material layer 22 by a vapor-phase process. The positive-electrode body 1 and the negative-electrode body 2 are bonded together by subjecting the electrode bodies 1 and 2 being arranged such that the solid-electrolyte layers 13 and 23 of the electrode bodies 1 and 2 are in contact with each other, to a heat treatment under application of a pressure to crystallize the PSE layer 13 and the NSE layer 23.

22 Claims, 3 Drawing Sheets

(56) References Cited

FOREIGN PATENT DOCUMENTS

| | | |
|---|---|---|
| JP | 2008-171588 A | 7/2008 |
| JP | 2008-243736 A | 10/2008 |
| JP | 2008-288098 A | 11/2008 |
| JP | 2009-054596 A | 3/2009 |
| JP | 2010-177024 A | 8/2010 |
| JP | 2010-218827 A | 9/2010 |
| JP | 2010-225390 A | 10/2010 |
| JP | 2010-262798 A | 11/2010 |
| JP | 2010-272368 A | 12/2010 |

METHOD FOR PRODUCING NONAQUEOUS-ELECTROLYTE BATTERY AND NONAQUEOUS-ELECTROLYTE BATTERY

TECHNICAL FIELD

The present invention relates to a method for producing a nonaqueous-electrolyte battery in which a positive-electrode body including a positive-electrode active-material layer and a positive-electrode-side solid-electrolyte layer and a negative-electrode body including a negative-electrode active-material layer and a negative-electrode-side solid-electrolyte layer are separately produced and the electrode bodies are laminated in a subsequent step; and a nonaqueous-electrolyte battery obtained by the production method.

BACKGROUND ART

Nonaqueous-electrolyte batteries including a positive-electrode layer, a negative-electrode layer, and an electrolyte layer disposed between the electrode layers are used as power supplies that are intended to be repeatedly charged and discharged. The electrode layers of such a battery include a collector having a current-collecting function and an active-material layer containing an active material. Among such nonaqueous-electrolyte batteries, in particular, nonaqueous-electrolyte batteries that are charged and discharged through migration of Li ions between the positive- and negative-electrode layers, have a high discharge capacity in spite of the small size.

An example of techniques for producing such a nonaqueous-electrolyte battery is described in Patent Literature 1. In this Patent Literature 1, a nonaqueous-electrolyte battery is produced in the following manner. A positive-electrode body and a negative-electrode body are separately produced, the positive-electrode body having a positive-electrode active-material layer that is a powder-molded body on a positive-electrode collector, the negative-electrode body having a negative-electrode active-material layer that is a powder-molded body on a negative-electrode collector. Each of these electrode bodies has a solid-electrolyte layer. The positive-electrode body and the negative-electrode body are laminated to produce the nonaqueous-electrolyte battery. At the time of the lamination, in the technique in Patent Literature 1, the solid-electrolyte layers of the electrode bodies are press-bonded together under a high pressure of more than 950 MPa.

CITATION LIST

Patent Literature

PTL 1: Japanese Unexamined Patent Application Publication No. 2008-103289

SUMMARY OF INVENTION

Technical Problem

However, the nonaqueous-electrolyte battery in Patent Literature 1 has the following problems.

First, since the two electrode bodies are press-bonded together under a high pressure, for example, the electrode bodies may be cracked. In particular, active-material layers that are powder-molded bodies are easily cracked. Cracking of such an active-material layer may result in considerable degradation of the performance of the nonaqueous-electrolyte battery.

Second, since the solid-electrolyte layer of the nonaqueous-electrolyte battery in PTL 1 is formed by press-bonding together a positive-electrode-side solid-electrolyte layer and a negative-electrode-side solid-electrolyte layer, a bonding interface is formed between the positive-electrode-side solid-electrolyte layer and the negative-electrode-side solid-electrolyte layer. The bonding interface tends to have a high resistance. Accordingly, the discharge capacity or discharge output of the nonaqueous-electrolyte battery may be much lower than the theoretical value.

The present invention has been made under the above-described circumstances. An object of the present invention is to provide a method for producing a nonaqueous-electrolyte battery by which, in spite of bonding of two electrode bodies that are separately produced, a nonaqueous-electrolyte battery in which a high-resistance layer is not formed at the bonding interface between the electrode bodies can be produced; and a nonaqueous-electrolyte battery obtained by the production method.

Solution to Problem

Regarding a method for producing a nonaqueous-electrolyte battery according to the present invention, there are three aspects. These three aspects will be sequentially described.

(1) A method for producing a nonaqueous-electrolyte battery according to the present invention is a method for producing a nonaqueous-electrolyte battery including a positive-electrode active-material layer, a negative-electrode active-material layer, and a sulfide-solid-electrolyte layer (hereafter, a SE layer) disposed between these active-material layers, the method including the following steps.

- A step of preparing a positive-electrode body including a positive-electrode active-material layer including a powder-molded body, and a positive-electrode-side solid-electrolyte layer (hereafter, a PSE layer) that is amorphous and formed on the positive-electrode active-material layer by a vapor-phase process.
- A step of preparing a negative-electrode body including a negative-electrode active-material layer including a powder-molded body, and a negative-electrode-side solid-electrolyte layer (hereafter, a NSE layer) that is amorphous and formed on the negative-electrode active-material layer by a vapor-phase process.
- A step of bonding together the positive-electrode body and the negative-electrode body by subjecting the electrode bodies being arranged such that the solid-electrolyte layers of the electrode bodies are in contact with each other, to a heat treatment under application of a pressure to crystallize the PSE layer and the NSE layer.

In a method for producing a nonaqueous-electrolyte battery according to the present invention, the PSE layer and the NSE layer are bonded together by utilizing atomic interdiffusion during change from amorphous to crystalline. Accordingly, a bonding interface having a high resistance is substantially not formed between the PSE layer and the NSE layer.

In addition, in a method for producing a nonaqueous-electrolyte battery according to the present invention, since the PSE layer and the NSE layer are bonded together by utilizing crystallization caused by a heat treatment, high-pressure compression of the positive-electrode body and the negative-electrode body is not necessary during bonding of the PSE layer and the NSE layer. Thus, defects such as cracking are less likely to occur in the constituent components of the electrode bodies. In particular, in a production method according to the present invention, the active-material layers each include a powder-molded body, which relatively easily cracks. Accordingly, the feature that high-pressure compression of the PSE layer and the NSE layer is not necessary is a huge advantage in the production of a nonaqueous-electrolyte battery. Note that the active-material layers each include a powder-molded body because thick active-material layers can be easily formed, compared with vapor-phase processes; and, as a result, a nonaqueous-electrolyte battery having a high discharge capacity can be produced.

(2) A method for producing a nonaqueous-electrolyte battery according to the present invention is a method for producing a nonaqueous-electrolyte battery including a positive-electrode active-material layer, a negative-electrode active-material layer, and a SE layer disposed between these active-material layers, the method including the following steps.

A step of preparing a positive-electrode body including a positive-electrode active-material layer including a powder-molded body, and a PSE layer that is amorphous, has a thickness of 2 µm or less, and is formed on the positive-electrode active-material layer by a vapor-phase process.

A step of preparing a negative-electrode body including a negative-electrode active-material layer including a powder-molded body.

A step of bonding together the positive-electrode body and the negative-electrode body by subjecting the electrode bodies being arranged such that the PSE layer and the negative-electrode active-material layer are in contact with each other, to a heat treatment under application of a pressure to crystallize the PSE layer.

Herein, each "thickness" in the Description denotes the average of thicknesses measured at five or more different portions. Regarding "thickness", the measurement can be performed by, for example, observation of a section with a scanning electron microscope.

The inventors of the present invention performed studies and, as a result, have found the following: when an amorphous PSE layer is a film having a small thickness of 2 µm or less, the PSE layer has high activity and hence the constituent material of the PSE layer tends to diffuse into the negative-electrode active-material layer during change of the PSE layer from amorphous to crystalline. Accordingly, when a nonaqueous-electrolyte battery is produced by the production method (2), a bonding interface having a high resistance is less likely to be formed between the positive-electrode body and the negative-electrode body in the battery. In contrast, when the PSE layer has a thickness of more than 2 µm, the PSE layer has low activity and the constituent material of the PSE layer is less likely to diffuse into the negative-electrode active-material layer. Accordingly, a bonding interface having a high resistance is formed between the positive-electrode body and the negative-electrode body.

In addition, in a nonaqueous-electrolyte battery obtained by the production method (2), the SE layer derived from the PSE layer has a very small thickness of 2 µm or less. Thus, the production method allows production of a nonaqueous-electrolyte battery having a smaller thickness than before.

(3) A method for producing a nonaqueous-electrolyte battery according to the present invention is a method for producing a nonaqueous-electrolyte battery including a positive-electrode active-material layer, a negative-electrode active-material layer, and a SE layer disposed between these active-material layers, the method including the following steps.

A step of preparing a positive-electrode body including a positive-electrode active-material layer including a powder-molded body.

A step of preparing a negative-electrode body including a negative-electrode active-material layer including a powder-molded body, and a NSE layer that is amorphous, has a thickness of 2 µm or less, and is formed on the negative-electrode active-material layer by a vapor-phase process.

A step of bonding together the positive-electrode body and the negative-electrode body by subjecting the electrode bodies being arranged such that the positive-electrode active-material layer and the NSE layer are in contact with each other, to a heat treatment under application of a pressure to crystallize the NSE layer.

The inventors of the present invention performed studies and, as a result, have found the following: when an amorphous NSE layer is a film having a small thickness of 2 µm or less, the NSE layer has high activity and hence the constituent material of the NSE layer tends to diffuse into the positive-electrode active-material layer during change of the NSE layer from amorphous to crystalline. Accordingly, when a nonaqueous-electrolyte battery is produced by the production method (3), a bonding interface having a high resistance is less likely to be formed between the positive-electrode body and the negative-electrode body in the battery. In contrast, when the NSE layer has a thickness of more than 2 µm, the NSE layer has low activity and the constituent material of the NSE layer is less likely to diffuse into the positive-electrode active-material layer. Accordingly, a bonding interface having a high resistance is formed between the positive-electrode body and the negative-electrode body.

In addition, in a nonaqueous-electrolyte battery obtained by the production method (3), the SE layer derived from the NSE layer has a very small thickness of 2 µm or less. Thus, the production method allows production of a nonaqueous-electrolyte battery having a smaller thickness than before.

Hereinafter, more preferred configurations of the above-described methods for producing a nonaqueous-electrolyte battery according to the present invention will be described.

(4) In a method for producing a nonaqueous-electrolyte battery according to an embodiment of the present invention, the heat treatment is preferably performed at 130° C. to 300° C. for 1 to 1200 minutes.

In the production method (1), heat-treatment conditions for bonding together the amorphous PSE layer and the amorphous NSE layer through crystallization can be appropriately selected in accordance with the type of the sulfide constituting the PSE layer and the NSE layer. Regarding the sulfide, in particular, $Li_2S$—$P_2S_5$ is used. $Li_2S$—$P_2S_5$ can be sufficiently crystallized under the above-described heat-treatment conditions. Here, when the heat-treatment temperature is excessively low or the heat-treatment time is excessively short, the PSE layer and the NSE layer are not sufficiently crystallized and a bonding interface may be formed between the PSE layer and the NSE layer. On the other hand, when the heat-treatment temperature is excessively high or the heat-treatment time is excessively long, a crystal phase having a low Li-ion conductivity may be formed. By increasing the heat-treatment temperature in the above-described range, the time for crystallization (that is, the heat-treatment time) can be increasingly shortened. These descriptions also apply to the case for the production methods (2) and (3) in which a solid-electrolyte layer is formed in only one of the electrode bodies.

Note that the crystallization temperature of an amorphous $Li_2S$—$P_2S_5$ solid-electrolyte layer formed by a vapor-phase process is different from the crystallization temperature of a solid-electrolyte layer formed by press-molding an amorphous $Li_2S-P_2S_5$ powder. Specifically, the crystallization temperature of a $Li_2S-P_2S_5$ solid-electrolyte layer formed by a vapor-phase process is about 130° C., whereas the crystallization temperature of a $Li_2S-P_2S_5$ solid-electrolyte layer formed by a powder-molding process is about 240° C. Since the PSE layer and the NSE layer in a production method according to the present invention are formed by a vapor-phase process, the PSE layer and the NSE layer are crystallized at about 130° C.

(5) In a method for producing a nonaqueous-electrolyte battery according to an embodiment of the present invention, the pressure applied is preferably 160 MPa or less.

When the pressure applied is 160 MPa or less, more preferably 16 MPa or less, defects such as cracking in layers of the positive-electrode body and the negative-electrode body can be suppressed during bonding of these electrode bodies.

(6) In a method for producing a nonaqueous-electrolyte battery according to an embodiment of the present invention, the solid-electrolyte layer formed on the active-material layers preferably has a C content of 10 atomic % or less. Specifically, when the positive-electrode body includes a PSE layer and the negative-electrode body includes a NSE layer, the PSE layer and the NSE layer are made to have a C content of 10 atomic % or less; when the positive-electrode body alone includes a solid-electrolyte layer (PSE layer), the PSE layer is made to have a C content of 10 atomic % or less; when the negative-electrode body alone includes a solid-electrolyte layer (NSE layer), the NSE layer is made to have a C content of 10 atomic % or less.

When the solid-electrolyte layer is made to have a C content of 10 atomic % or less, a decrease in the Li-ion conductivity of the SE layer can be avoided, the decrease being caused by alteration of the solid electrolyte contained in the solid-electrolyte layer due to the influence of C.

Hereinafter, nonaqueous-electrolyte batteries according to the present invention will be described.

(7) A nonaqueous-electrolyte battery according to the present invention is a nonaqueous-electrolyte battery including a positive-electrode active-material layer, a negative-electrode active-material layer, and a sulfide SE layer disposed between these active-material layers. In this nonaqueous-electrolyte battery, the positive-electrode active-material layer and the negative-electrode active-material layer each include a powder-molded body. The SE layer is a crystalline integrated layer formed by bonding together a PSE layer disposed on a side of the positive-electrode active-material layer and a NSE layer disposed on a side of the negative-electrode active-material layer. This SE layer preferably has a resistance of 50 $\Omega \cdot cm^2$ or less, more preferably 20 $\Omega \cdot cm^2$ or less.

A nonaqueous-electrolyte battery having the above-described configuration according to the present invention is a nonaqueous-electrolyte battery produced by the production method (1). In this battery, the SE layer has a low resistance, compared with batteries produced by existing methods. Accordingly, the battery exhibits excellent battery characteristics (discharge capacity and discharge output), compared with existing batteries.

(8) A nonaqueous-electrolyte battery according to the present invention is a nonaqueous-electrolyte battery including a positive-electrode active-material layer, a negative-electrode active-material layer, and a sulfide SE layer disposed between these active-material layers. In this nonaqueous-electrolyte battery, the positive-electrode active-material layer and the negative-electrode active-material layer each include a powder-molded body. The SE layer is a crystalline layer having a thickness of 2 μm or less. This SE layer has a resistance of 50 $\Omega \cdot cm^2$ or less.

A nonaqueous-electrolyte battery having the above-described configuration according to the present invention is a nonaqueous-electrolyte battery produced by the production method (2) or (3). In this battery, the SE layer has a low resistance, compared with batteries produced by existing methods. Accordingly, the battery exhibits excellent battery characteristics (discharge capacity and discharge output), compared with existing batteries. In addition, the above-described nonaqueous-electrolyte battery according to the present invention includes the SE layer having a thickness that is probably the smallest to date. Accordingly, the nonaqueous-electrolyte battery has a very small thickness, compared with existing batteries.

(9) In a nonaqueous-electrolyte battery according to an embodiment of the present invention, the SE layer preferably has a C content of 10 atomic % or less.

When the SE layer is made to have a C content of 10 atomic % or less, a decrease in the Li-ion conductivity of the SE layer can be avoided, the decrease being caused by alteration of the solid electrolyte due to the influence of C.

(10) In a nonaqueous-electrolyte battery according to an embodiment of the present invention, the positive-electrode active-material layer preferably contains an active material containing an oxide containing Li and at least one metal selected from Co, Mn, Ni, Fe, and Al, and a solid electrolyte containing $Li_2S-P_2S_5$.

When the positive-electrode active-material layer contains the above-described active material, the discharge capacity of the nonaqueous-electrolyte battery can be increased. When the positive-electrode active-material layer contains the solid electrolyte, the resistance of the positive-electrode active-material layer can be decreased and, as a result, the discharge capacity of the battery can be increased.

(11) In a nonaqueous-electrolyte battery according to an embodiment of the present invention, the negative-electrode active-material layer preferably contains an active material containing at least one element selected from C, Si, Ge, Sn, Al, and Li, or an active material containing an oxide at least containing Ti and Li, and a solid electrolyte containing $Li_2S-P_2S_5$.

When the negative-electrode active-material layer contains such an active material, the discharge capacity of the nonaqueous-electrolyte battery can be increased. When the negative-electrode active-material layer contains the solid electrolyte, the resistance of the negative-electrode active-material layer can be decreased and, as a result, the discharge capacity of the battery can be increased.

Advantageous Effects of Invention

In a method for producing a nonaqueous-electrolyte battery according to the present invention, in spite of bonding of a positive-electrode body and a negative-electrode body that are separately produced, in the resultant nonaqueous-electrolyte battery according to the present invention, a high-resistance layer is not formed between the positive-electrode body and the negative-electrode body. Therefore, a nonaqueous-electrolyte battery according to the present invention exhibits excellent battery characteristics.

DESCRIPTION OF EMBODIMENTS

First Embodiment

<Overall Configuration of Nonaqueous-Electrolyte Battery>

Figure 1:
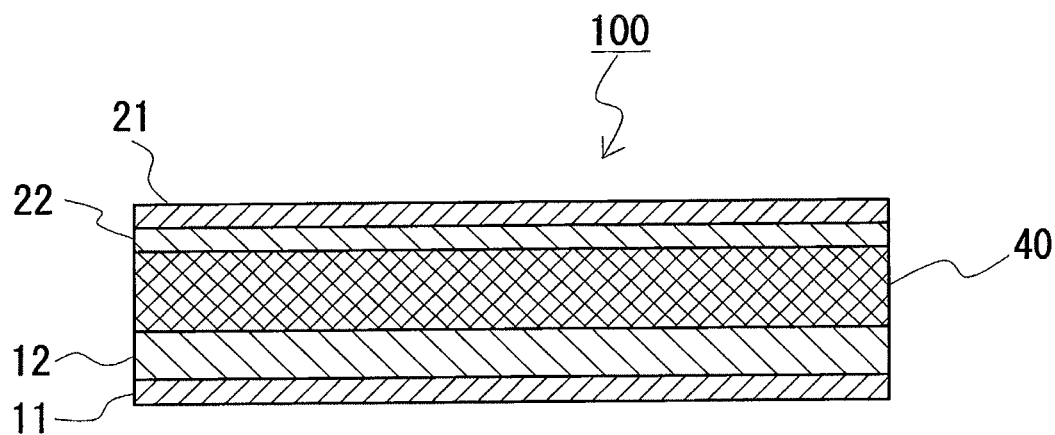
FIG. 1 is a longitudinal sectional view of a nonaqueous-electrolyte battery produced by laminating a positive-electrode body and a negative-electrode body.
Figure 2:
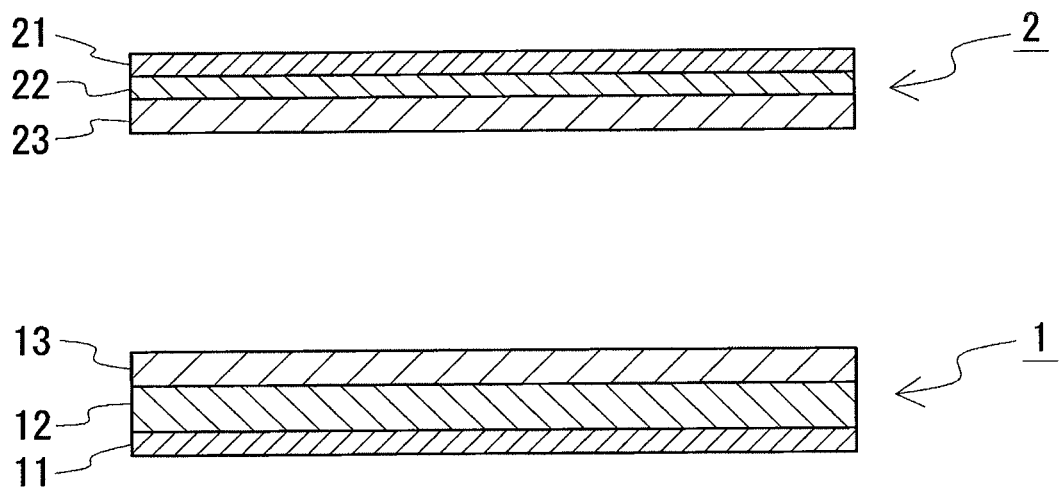
FIG. 2 is a longitudinal sectional view of a positive-electrode body and a negative-electrode body to be laminated according to a first embodiment.

A nonaqueous-electrolyte battery 100 illustrated in FIG. 1 includes a positive-electrode collector 11, a positive-electrode active-material layer 12, a sulfide-solid-electrolyte layer (SE layer) 40, a negative-electrode active-material layer 22, and a negative-electrode collector 21. The nonaqueous-electrolyte battery 100 can be produced by a method for producing a nonaqueous-electrolyte battery including steps described below, that is, by laminating a positive-electrode body 1 and a negative-electrode body 2 that are separately produced as illustrated in FIG. 2.

<Method for Producing Nonaqueous-Electrolyte Battery>

(α) The positive-electrode body 1 is produced.

(β) The negative-electrode body 2 is produced.

(γ) The positive-electrode body 1 and the negative-electrode body 2 are arranged so as to be in contact with each other and subjected to a heat treatment under application of a pressure to bond together the positive-electrode body 1 and the negative-electrode body 2.

Note that the order of the steps α and β can be inverted.

<<Step α: Production of Positive-Electrode Body>>

The positive-electrode body 1 of the present embodiment has a configuration in which the positive-electrode active-material layer 12 and a positive-electrode-side solid-electrolyte layer (PSE layer) 13 are stacked on the positive-electrode collector 11. The positive-electrode body 1 may be produced by preparing a substrate that serves as the positive-electrode collector 11 and sequentially forming the other layers 12 and 13 on the substrate. Alternatively, the positive-electrode collector 11 may be formed on a surface of the positive-electrode active-material layer 12, the surface being opposite to the PSE layer 13, after the step γ of bonding together the positive-electrode body 1 and the negative-electrode body 2.

[Positive-Electrode Collector]

The substrate that serves as the positive-electrode collector 11 may be composed of a conductive material only or may be constituted by an insulating substrate having a conductive-material film thereon. In the latter case, the conductive-material film functions as a collector. The conductive material is preferably any one selected from Al, Ni, alloys of the foregoing, and stainless steel.

[Positive-Electrode Active-Material Layer]

The positive-electrode active-material layer 12 is a layer obtained by press-molding a powder containing positive-electrode active-material particles serving as a main material of the battery reaction. The positive-electrode active material may be a substance having a layered rock-salt crystal structure, for example, a substance represented by Liα$_x$β$_{(1-x)}$O$_2$ (α represents at least one selected from Co, Ni, and Mn; β represents any one selected from Fe, Al, Ti, Cr, Zn, Mo, and Bi; X is 0.5 or more). Specific examples of the substance include $LiCoO_2$, $LiNiO_2$, $LiMnO_2$, $LiCo_{0.5}Fe_{0.5}O_2$, $LiCo_{0.5}Al_{0.5}O_2$, and $LiNi_{0.8}Co_{0.15}Al_{0.05}O_2$. Other examples of the positive-electrode active material include a substance having a spinel crystal structure (for example, $LiMn_2O_4$) and a substance having an olivine crystal structure (for example, $Li_xFePO_4$ (0<X<1)).

The positive-electrode active-material layer 12 may contain electrolyte particles that improve the Li-ion conductivity of the layer 12. In this case, the electrolyte particles are mixed with positive-electrode active-material particles serving as a raw material for the press-molding. Thus, press-molding of the raw material allows the formation of the positive-electrode active-material layer 12 containing the positive-electrode active-material particles and the solid-electrolyte particles. The electrolyte particles may be preferably composed of, for example, a sulfide such as $Li_2S$—$P_2S_5$. Although the solid-electrolyte particles contained in the positive-electrode active-material layer 12 may be amorphous or crystalline, crystalline particles having a high Li-ion conductivity are preferred. In addition, the positive-electrode active-material layer 12 may contain a conductive aid or a binder.

Conditions for the press-molding can be appropriately selected. For example, the press-molding is preferably performed in an atmosphere at room temperature to 300° C. and at a surface pressure of 100 to 600 MPa. The positive-electrode active-material particles that are press-molded preferably have an average size of 1 to 20 μm. In addition, when electrolyte particles are used, the electrolyte particles preferably have an average size of 0.5 to 2 μm.

[Positive-Electrode-Side Solid-Electrolyte Layer]

The positive-electrode-side solid-electrolyte layer (PSE layer) 13 is an amorphous Li-ion conductor containing a sulfide. The PSE layer 13 is crystallized by the step γ described below and serves as a portion of the SE layer 40 in the completed battery 100 illustrated in FIG. 1. Characteristics required for the PSE layer 13 are, after crystallization, a high Li-ion conductivity and a low electron conductivity. For example, after the PSE layer 13 in the amorphous state is crystallized, it preferably has a Li-ion conductivity (20° C.) of $10^{-5}$ S/cm or more, in particular, $10^{-4}$ S/cm or more. The PSE layer 13 having been crystallized preferably has an electron conductivity of $10^{-8}$ S/cm or less. The material of the PSE layer 13 may be, for example, $Li_2S$—$P_2S_5$. The PSE layer 13 may contain an oxide such as $P_2O_5$.

The PSE layer 13 may be formed by a vapor-phase process. Examples of the vapor-phase process include a vacuum deposition process, a sputtering process, an ion plating process, and a laser ablation process. In order to form the PSE layer 13 in the amorphous state, for example, the base member is cooled such that the temperature of the base member during film formation is equal to or lower than the crystallization temperature of the film. For example, when the PSE layer 13 is formed of $Li_2S$—$P_2S_5$, the temperature of the base member during film formation is preferably set to be 150° C. or less.

The PSE layer 13 formed by such a vapor-phase process preferably has a thickness of 0.1 to 5 μm. When the vapor-phase process is employed, even in the case of the PSE layer 13 having such a small thickness, defects such as pin holes are scarcely generated in the PSE layer 13 and portions where the PSE layer 13 is not formed are scarcely left.

The PSE layer 13 preferably does not have a high C (carbon) content. This is because C may alter the solid electrolyte, resulting in a decrease in the Li-ion conductivity of the PSE layer 13. The PSE layer 13 becomes the SE layer 40 in a subsequent step. Accordingly, when the Li-ion conductivity of the PSE layer 13 decreases, the Li-ion conductivity of the SE layer 40 also decreases, resulting in degradation of the performance of the nonaqueous-electrolyte battery 100. For this reason, the C content of the PSE layer 13 is preferably 10 atomic % or less, more preferably 5 atomic % or less, still more preferably 3 atomic % or less. Most preferably, the PSE layer 13 substantially does not contain C.

C contained in the PSE layer 13 is mainly derived from C contained as an impurity in a source material used for forming the PSE layer 13. For example, since lithium carbonate ($Li_2CO_3$) is used in the synthesis process of $Li_2S$—$P_2S_5$, which is a typical sulfide solid electrolyte, a source material having a low $Li_2S$—$P_2S_5$ purity may have a high C content. Thus, in order to suppress the C content of the PSE layer 13, the PSE layer 13 is preferably formed from a source material having a high $Li_2S$—$P_2S_5$ purity and a low C content. The source material having a high $Li_2S$—$P_2S_5$ purity may be, for example, a commercially available product adjusted to have a low C content.

In addition, C contained in the PSE layer 13 may be derived from a boat for holding a source material during the film formation of the PSE layer 13 by a vapor-phase process. The boat may be formed of C and C of the boat may enter the PSE layer 13 due to heat for evaporating the source material. However, by adjusting film-formation conditions such as the boat heating temperature and the atmosphere pressure during film formation, entry of C into the PSE layer 13 can be effectively suppressed.

[Other Configurations]

When the PSE layer 13 contains a sulfide solid electrolyte, this sulfide solid electrolyte reacts with a positive-electrode active material that is an oxide and contained in the positive-electrode active-material layer 12 adjacent to the PSE layer 13. As a result, the resistance of the near-interface region between the positive-electrode active-material layer 12 and the PSE layer 13 may increase and the discharge capacity of the nonaqueous-electrolyte battery 100 may decrease. Thus, in order to suppress an increase in the resistance of the near-interface region, an intermediate layer may be formed between the positive-electrode active-material layer 12 and the PSE layer 13.

A material used for the intermediate layer may be an amorphous Li-ion-conductive oxide such as $LiNbO_3$, $LiTaO_3$, or $Li_4Ti_5O_{12}$. In particular, $LiNbO_3$ allows effective suppression of an increase in the resistance of the near-interface region between the positive-electrode active-material layer 12 and the PSE layer 13.

<<Step β: Production of Negative-Electrode Body>>

The negative-electrode body 2 has a configuration in which the negative-electrode active-material layer 22 and a negative-electrode-side solid-electrolyte layer (NSE layer) 23 are stacked on the negative-electrode collector 21. The negative-electrode body 2 may be produced by preparing a substrate that serves as the negative-electrode collector 21 and sequentially forming the other layers 22 and 23 on the substrate. Alternatively, the negative-electrode collector 21 may be formed, after the step γ, on a surface of the negative-electrode active-material layer 22, the surface being opposite to the NSE layer 23.

[Negative-Electrode Collector]

The substrate that serves as the negative-electrode collector 21 may be composed of a conductive material only or may be constituted by an insulating substrate having a conductive-material film thereon. In the latter case, the conductive-material film functions as a collector. For example, the conductive material is preferably any one selected from Al, Cu, Ni, Fe, Cr, and alloys of the foregoing (for example, stainless steel).

[Negative-Electrode Active-Material Layer]

The negative-electrode active-material layer 22 is a layer obtained by press-molding a powder containing negative-electrode active-material particles serving as a main material of the battery reaction. The negative-electrode active material may be C, Si, Ge, Sn, Al, a Li alloy, or a Li-containing oxide such as $Li_4Ti_5O_{12}$. Another negative-electrode active material usable is a compound represented by $La_3M_2Sn_7$ (M=Ni or Co).

The negative-electrode active-material layer 22 may contain electrolyte particles that improve the Li-ion conductivity of the layer 22. In this case, the electrolyte particles are mixed with negative-electrode active-material particles serving as a raw material for the press-molding. Thus, press-molding of the raw material allows the formation of the negative-electrode active-material layer 22 containing the negative-electrode active-material particles and the solid-electrolyte particles. The electrolyte particles may be preferably composed of, for example, a sulfide such as $Li_2S$—$P_2S_5$. Although the solid-electrolyte particles contained in the negative-electrode active-material layer 22 may be amorphous or crystalline, crystalline particles having a high Li-ion conductivity are preferred. In addition, the negative-electrode active-material layer 22 may contain a conductive aid or a binder.

Conditions for the press-molding can be appropriately selected. For example, the press-molding is preferably performed in an atmosphere at room temperature to 300° C. and at a surface pressure of 100 to 600 MPa. The negative-electrode active-material particles that are press-molded preferably have an average size of 1 to 20 μm. In addition, when electrolyte particles are used, the electrolyte particles preferably have an average size of 0.5 to 2 μm.

[Negative-Electrode-Side Solid-Electrolyte Layer]

As with the PSE layer 13 described above, the negative-electrode-side solid-electrolyte layer (NSE layer) 23 is an amorphous Li-ion conductor containing a sulfide. The NSE layer 23 also serves as a portion of the SE layer 40 of the battery 100 when the battery 100 is completed through the subsequent step γ. The NSE layer 23 having been crystallized is required to have a high Li-ion conductivity and a low electron conductivity. As in the PSE layer 13, the material of the NSE layer 23 is preferably $Li_2S$—$P_2S_5$ (if necessary, containing $P_2O_5$) or the like. In particular, this NSE layer 23 and the above-described PSE layer 13 are preferably the same in terms of composition, production process, and the like. This is because, when the NSE layer 23 and the PSE layer 13 are subjected to the subsequent step γ to constitute a monolayer, the SE layer 40, variations in the Li-ion conductivity in the thickness direction of the SE layer 40 are suppressed.

The NSE layer 23 formed by such a vapor-phase process preferably has a thickness of 0.1 to 5 μm. When the vapor-phase process is employed, even in the case of the NSE layer 23 having such a small thickness, defects such as pin holes are scarcely generated in the NSE layer 23 and portions where the NSE layer 23 is not formed are scarcely left.

As with the PSE layer 13, the NSE layer 23 preferably does not have a high C (carbon) content. The reason for this, preferred values of the C content of the NSE layer 23, and the method for adjusting the C content of the NSE layer 23 are the same as in the PSE layer 13.

<<Step γ: Bonding Together Positive-Electrode Body and Negative-Electrode Body>>

Subsequently, the positive-electrode body 1 and the negative-electrode body 2 are laminated such that the PSE layer 13 and the NSE layer 23 face each other to produce the nonaqueous-electrolyte battery 100. At this time, the PSE layer 13 and the NSE layer 23 being in contact with each other under a pressure are subjected to a heat treatment so that the PSE layer 13 and the NSE layer 23 in the amorphous state are crystallized. Thus, the PSE layer 13 and the NSE layer 23 are integrated.

The heat-treatment conditions in the step γ are selected so that the PSE layer 13 and the NSE layer 23 can be crystallized. When the heat-treatment temperature is excessively low, the PSE layer 13 and the NSE layer 23 are not sufficiently crystallized and a large number of unbonded interfacial portions remain between the PSE layer 13 and the NSE layer 23. Thus, the PSE layer 13 and the NSE layer 23 are not integrated. Conversely, when the heat-treatment temperature is excessively high, the PSE layer 13 and the NSE layer 23 are integrated, but a crystal phase having a low Li-ion conductivity may be formed. As with the heat-treatment temperature, a heat-treatment time that is excessively short may cause insufficient integration and a heat-treatment time that is excessively long may cause generation of a crystal phase having a low Li-ion conductivity. Although specific heat-treatment conditions vary in accordance with, for example, the composition of the PSE layer 13 and the NSE layer 23, in general, the heat-treatment conditions are preferably 130° C. to 300° C.×1 to 1200 minutes, more preferably 150° C. to 250° C.×30 to 150 minutes.

In the step γ, during the heat treatment, a pressure is applied in such directions that the PSE layer 13 and the NSE layer 23 are pressed onto each other. This is because the PSE layer 13 and the NSE layer 23 are kept in tight contact with each other during the heat treatment to thereby promote integration of the PSE layer 13 and the NSE layer 23. Even when the pressure applied is very low, the effect of promoting integration of the PSE layer 13 and the NSE layer 23 is provided. However, a high pressure facilitates promotion of the integration. Note that application of a high pressure may cause defects such as cracking in layers of the positive-electrode body 1 and the negative-electrode body 2. In particular, the positive-electrode active-material layer 12 and the negative-electrode active-material layer 22, which are powder-molded bodies, tend to crack. Thus, the pressure is preferably 160 MPa or less. Note that, since integration of the PSE layer 13 and the NSE layer 23 is actually achieved by a heat treatment, application of a pressure of 1 to 20 MPa will suffice.

By performing the step γ, the nonaqueous-electrolyte battery 100 including the SE layer 40, which is a crystallized monolayer, is formed. As described above, this monolayer, the SE layer 40 is formed by integration of the PSE layer 13 and the NSE layer 23. However, the interface between the PSE layer 13 and the NSE layer 23 scarcely remains. Accordingly, in the SE layer 40, a decrease in the Li-ion conductivity due to the interface does not occur. Thus, the SE layer 40 has a high Li-ion conductivity and a low electron conductivity. Note that the SE layer 40 tends to have marks formed by integration of the PSE layer 13 and the NSE layer 23, due to, for example, surface roughness of the PSE layer 13 and the NSE layer 23 to be integrated. In observation of the SE layer 40 in a longitudinal section of the nonaqueous-electrolyte battery 100, the marks are observed as cavities discontinuously arranged on an imaginary line extending in the width direction of the battery 100. The marks are preferably small. For example, the size of the marks can be evaluated on the basis of, in observation of a longitudinal section of the battery 100, the proportion of the total lengths of cavity portions with respect to the entire width length of the battery 100 (length in the left-right direction in FIG. 1). The proportion is preferably 5% or less, more preferably 3% or less, most preferably 1% or less. Needless to say, for example, the surface state of the PSE layer 13 and the NSE layer 23 to be integrated are preferably improved so that the PSE layer 13 and the NSE layer 23 are integrated to provide the SE layer 40 having no marks formed by bonding between the PSE layer 13 and the NSE layer 23.

Figure 3:
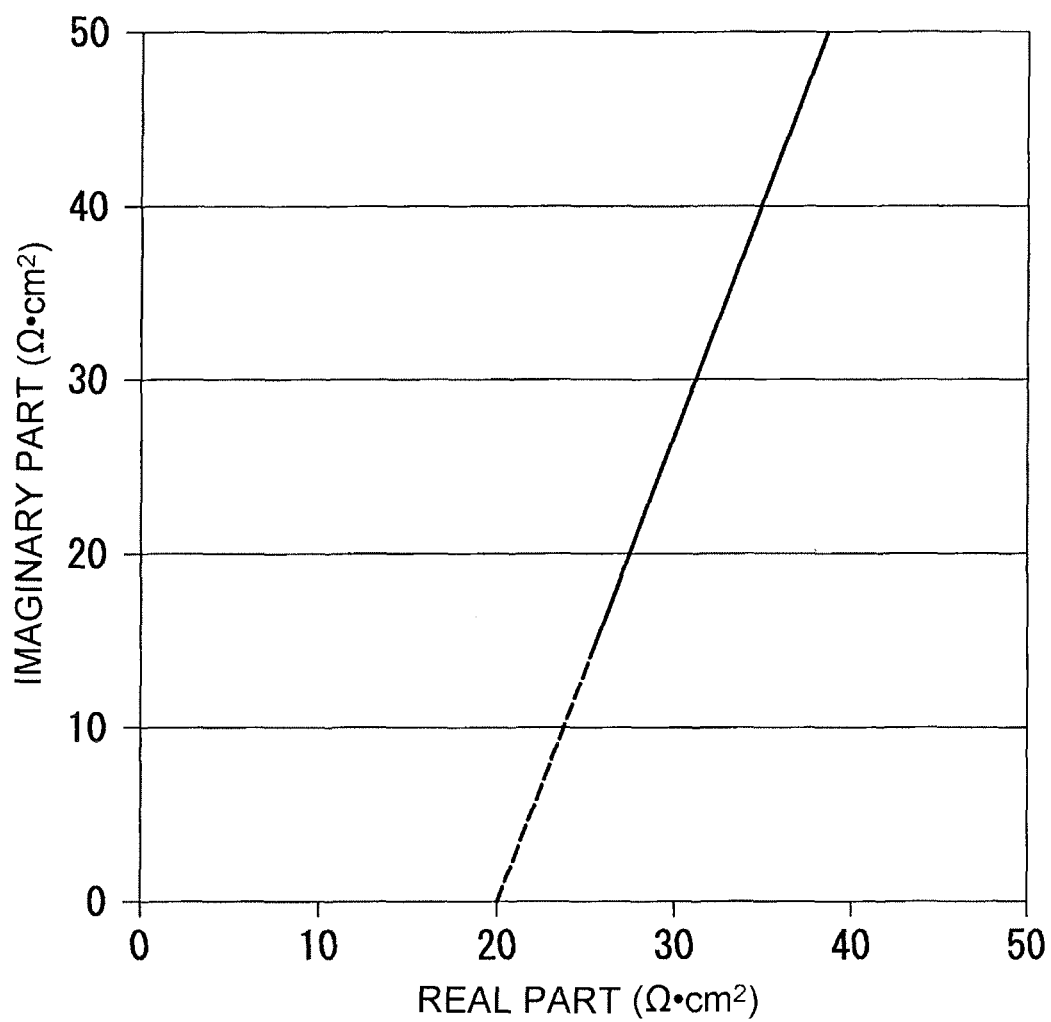
FIG. 3 is a schematic view illustrating an example of a Nyquist diagram obtained by an alternating current impedance method.

Regarding a characteristic of the SE layer 40 formed through the step γ, the resistance of the SE layer 40 is 50 $\Omega \cdot cm^2$ or less. The resistance is measured by the alternating current impedance method under the following measurement conditions: a voltage amplitude of 5 mV and a frequency in a range of 0.01 Hz to 10 kHz. In a Nyquist diagram (refer to FIG. 3) obtained by the alternating current impedance measurement, the intersection between the real axis and an extension (dotted line in the diagram) from a Nyquist plot (solid line in the diagram) corresponding to the highest frequency represents the resistance of the SE layer 40. This has been revealed by analysis of calculation results of an equivalent circuit and measurement results. In the case of the battery 100 providing the result in FIG. 3, the SE layer 40 has a resistance of 20 $\Omega \cdot cm^2$.

The SE layer 40 preferably does not have a high C content. The reason for this is that, as described in the description of the PSE layer 13, C may alter the solid electrolyte. The C content of the SE layer 40 can be regarded as the total of the C content of the PSE layer 13 and the C content of the NSE layer 23. Accordingly, the C content of the SE layer 40 is preferably 10 atomic % or less.

<Advantages of Nonaqueous-Electrolyte Battery>

Compared with existing batteries obtained by press-bonding together the positive-electrode body 1 and the negative-electrode body 2 under a high pressure, the nonaqueous-electrolyte battery 100 obtained by the above-described production method exhibits excellent battery characteristics (discharge capacity and discharge output). This is because, in the SE layer 40, a high-resistance layer is not formed at the bonding interface between the PSE layer 13 and the NSE layer 23.

Second Embodiment

Figure 4:
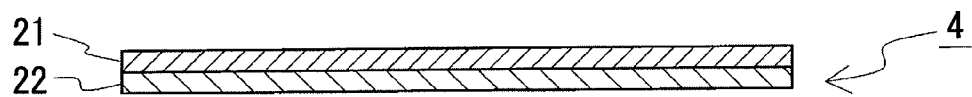
FIG. 4 is a longitudinal sectional view of a positive-electrode body and a negative-electrode body to be laminated according to a second embodiment.
Figure 4:
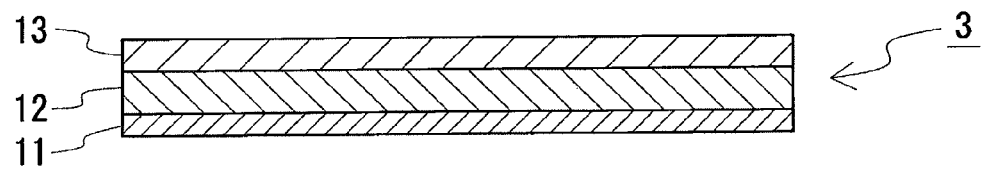

Alternatively, the nonaqueous-electrolyte battery 100 illustrated in FIG. 1 can be produced by a method for producing a nonaqueous-electrolyte battery including steps described below with reference to FIG. 4.

<Method for Producing Nonaqueous-Electrolyte Battery>

(δ) A positive-electrode body 3 including a positive-electrode active-material layer 12 and a PSE layer 13 is produced.

(ε) A negative-electrode body 4 including a negative-electrode active-material layer 22 but not including a NSE layer is produced.

(ξ) The positive-electrode body 3 and the negative-electrode body 4 are arranged so as to be in contact with each other and subjected to a heat treatment under application of a pressure to bond together the positive-electrode body 3 and the negative-electrode body 4.

Note that the order of the steps δ and ε can be inverted.

The configurations of the layers of the positive-electrode body 3 and the negative-electrode body 4 and the conditions of the heat treatment under application of a pressure during bonding of the electrode bodies 3 and 4 are the same as in the first embodiment. Note that the PSE layer 13 needs to have a thickness of 2 μm or less. When the PSE layer 13 has a thickness of 2 μm or less, the solid electrolyte contained in the PSE layer 13 has high activity; when the positive-electrode body 3 and the negative-electrode body 4 are arranged so as to be in contact with each other and subjected to a heat treatment, the amorphous solid electrolyte in the PSE layer 13 tends to diffuse into the negative-electrode active-material layer 22. Accordingly, in the heat treatment, the amorphous solid electrolyte that is being crystallized in the PSE layer 13 is bonded to crystalline solid-electrolyte particles contained in the negative-electrode active-material layer 22. Thus, the positive-electrode body 3 and the negative-electrode body 4 are bonded together without substantial formation of a bonding interface between the positive-electrode body 3 and the negative-electrode body 4. Regarding the resultant SE layer 40 obtained through the step the resistance measured by the alternating current impedance method under the same conditions as in the first embodiment is also found to be 50 Ω·cm² or less. In contrast, when the PSE layer 13 has a thickness of more than 2 μm, the amorphous solid electrolyte contained in the PSE layer 13 has low activity and is less likely to diffuse into the negative-electrode active-material layer 22 by a heat treatment. Accordingly, a bonding interface having a high resistance tends to be formed between the positive-electrode body 3 and the negative-electrode body 4.

Third Embodiment

Figure 5:
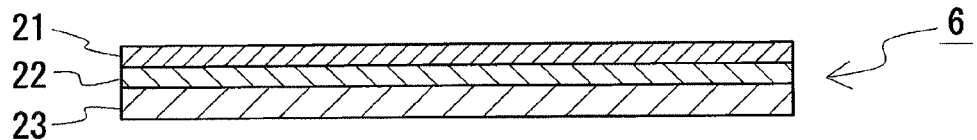
FIG. 5 is a longitudinal sectional view of a positive-electrode body and a negative-electrode body to be laminated according to a third embodiment.
Figure 5:
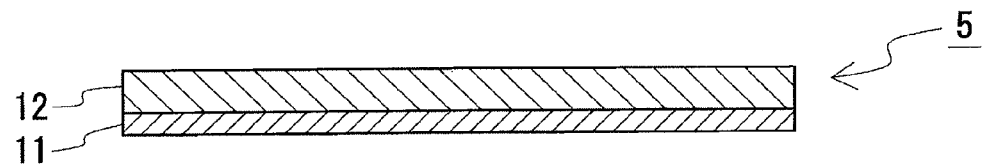

Alternatively, the nonaqueous-electrolyte battery 100 illustrated in FIG. 1 can be produced by a method for producing a nonaqueous-electrolyte battery including steps described below with reference to FIG. 5.
<Method for Producing Nonaqueous-Electrolyte Battery>
(η) A positive-electrode body 5 including a positive-electrode active-material layer 12 but not including a PSE layer is produced.
(θ) A negative-electrode body 6 including a negative-electrode active-material layer 22 and a NSE layer 23 is produced.
(τ) The positive-electrode body 5 and the negative-electrode body 6 are arranged so as to be in contact with each other and subjected to a heat treatment under application of a pressure to bond together the positive-electrode body 5 and the negative-electrode body 6.

Note that the order of the steps η and θ can be inverted.
The configurations of the layers of the positive-electrode body 5 and the negative-electrode body 6 and the conditions of the heat treatment under application of a pressure during bonding of the electrode bodies 5 and 6 are the same as in the first embodiment. Note that the NSE layer 23 needs to have a thickness of 2 μm or less so that, as in the second embodiment, the amorphous solid electrolyte contained in the NSE layer 23 has high activity. As a result, in the heat treatment, the amorphous solid electrolyte that is being crystallized in the NSE layer 23 is bonded to crystalline solid-electrolyte particles contained in the positive-electrode active-material layer 12. Thus, the positive-electrode body 5 and the negative-electrode body 6 are bonded together without substantial formation of a bonding interface between the positive-electrode body 5 and the negative-electrode body 6. Regarding the resultant SE layer 40 obtained through the step τ, the resistance measured by the alternating current impedance method under the same conditions as in the first embodiment is also found to be 50 Ω·cm² or less.

Test Example 1

The nonaqueous-electrolyte batteries 100 according to an embodiment described with reference to FIG. 1 were produced. A battery characteristic of each battery 100 was evaluated by measuring the resistance of the SE layer 40 contained in the battery 100. In addition, nonaqueous-electrolyte batteries were produced for a comparative example and the resistance of a SE layer contained in each battery was also measured.

<Nonaqueous-Electrolyte Batteries in Example 1>
In order to produce each nonaqueous-electrolyte battery 100, the positive-electrode body 1 and the negative-electrode body 2 having the following configurations were prepared.
<<Positive-Electrode Body 1>>
  positive-electrode collector 11 Al foil having a thickness of 10 μm
  positive-electrode active-material layer 12 press-molded body composed of LiCoO₂ powder and Li₂S—P₂S₅ powder and having a thickness of 200 μm (LiCoO₂: Li₂S—P₂S₅=70 mass %:30 mass %)
  PSE layer 13 amorphous Li₂S—P₂S₅ film having a thickness of 5 μm (vacuum deposition process)
<<Negative-Electrode Body 2>>
  negative-electrode collector 21 stainless-steel foil having a thickness of 10 μm
  negative-electrode active-material layer 22 press-molded body composed of graphite powder and Li₂S—P₂S₅ powder and having a thickness of 200 μm (graphite: Li₂S—P₂S₅=50 mass %:50 mass %)
  NSE layer 23 amorphous Li₂S—P₂S₅ film having a thickness of 5 μm (vacuum deposition process)

Subsequently, the resistance of the PSE layer 13 of the positive-electrode body 1 prepared and the resistance of the NSE layer 23 of the negative-electrode body 2 prepared were measured by the alternating current impedance method under the following measurement conditions: a voltage amplitude of 5 mV and a frequency in a range of 0.01 Hz to 10 kHz. The measurement results are described in Table I below.

Finally, in a dry atmosphere at a dew point of −40° C., the positive-electrode body 1 and the negative-electrode body 2 prepared were arranged such that the SE layers 13 and 23 thereof were in contact with each other, and were subjected to a heat treatment while being pressed onto each other. Thus, a plurality of the nonaqueous-electrolyte batteries 100 were produced. In the production of the batteries 100, conditions of the heat treatment (in a range of 130° C. to 300° C.; in a range of 1 to 1200 minutes) and a condition of the application of a pressure (in a range of 8 to 160 MPa) were varied.

Each of the thus-produced nonaqueous-electrolyte batteries 100 was contained in a coin cell. The resistance of the SE layer 40 in the nonaqueous-electrolyte battery 100 was measured by the alternating current impedance method. The measurement conditions were the same as the conditions in the measurement of the resistance of the PSE layer 13 and the NSE layer 23. The bonding conditions and the measurement results of resistance are described in the following Table I.

TABLE I

| Sample No. | Bonding conditions | | | Resistance of PSE layer (Ω·cm²) | Resistance of NSE layer (Ω·cm²) | Resistance of SE layer (Ω·cm²) |
|---|---|---|---|---|---|---|
| | Pressure (MPa) | Temperature (° C.) | Holding time (min) | | | |
| 1 | 16 | 300 | 30 | 10 | 10 | 50 |
| 2 | 16 | 270 | 30 | 10 | 10 | 30 |
| 3 | 16 | 240 | 30 | 10 | 10 | 20 |
| 4 | 16 | 190 | 30 | 10 | 10 | 20 |
| 5 | 16 | 170 | 30 | 10 | 10 | 40 |
| 6 | 16 | 150 | 30 | 10 | 10 | 50 |
| 7 | 160 | 190 | 30 | 10 | 10 | 20 |
| 8 | 12 | 190 | 30 | 10 | 10 | 30 |
| 9 | 8 | 190 | 30 | 10 | 10 | 50 |
| 10 | 16 | 190 | 60 | 10 | 10 | 20 |
| 11 | 16 | 190 | 10 | 10 | 10 | 30 |
| 12 | 16 | 190 | 1 | 10 | 10 | 50 |
| 13 | 16 | 130 | 1200 | 10 | 10 | 50 |

In addition, regarding Samples 4 and 9, a portion probably corresponding to the boundary between the PSE layer 13 and the NSE layer 23 in a longitudinal section of each nonaqueous-electrolyte battery 100 was observed with a scanning electron microscope. As a result, in the SE layer 40, cavities that were marks formed by bonding of the PSE layer 13 and the NSE layer 23 were observed. The proportion of the total lengths of cavity portions with respect to the entire width length of the battery 100 (length in the left-right direction in FIG. 1) was 1% for Sample 4 and 3% for Sample 9.

<Nonaqueous-Electrolyte Batteries in Comparative Example 1>

A positive-electrode body having a crystallized PSE layer and a negative-electrode body having a crystallized NSE layer were prepared. These positive-electrode body and negative-electrode body were attempted to be bonded together under the conditions in Example. However, the PSE layer and the NSE layer were not integrated and the bonding between the PSE layer and the NSE layer was not observed. These PSE layer and NSE layer not integrated were brought into contact with each other (not being bonded together) under the application of a pressure to provide a nonaqueous-electrolyte battery and the resistance of the SE layer of this battery was measured. This resistance was very high, compared with the SE layers of the nonaqueous-electrolyte batteries in Example. Accordingly, the discharge capacity and discharge output of a battery having a contact interface probably become very low, compared with a battery not having a contact interface. This is presumably because the resistance of the contact interface is very high, compared with the resistance of portions other than the contact interface.

Subsequently, a positive-electrode body having a crystallized PSE layer and a negative-electrode body having a crystallized NSE layer were bonded together at 300 MPa. In this case, although the PSE layer and the NSE layer were integrated in very small areas, the PSE layer and the NSE layer were not integrated in the remaining large areas. When the pressure applied is increased, the areas in which the PSE layer and the NSE layer are integrated are probably increased. However, complete integration of the PSE layer and the NSE layer is not probably achieved. In addition, an increase in the pressure applied causes an increase in the probability of the occurrence of defects such as cracking in layers of the positive-electrode body and the negative-electrode body.

<Summary>

The results of the nonaqueous-electrolyte batteries in Example and Comparative example described above indicate the following: when the PSE layer 13 of the positive-electrode body 1 and the NSE layer 23 of the negative-electrode body 2 are amorphous, and the PSE layer 13 and the NSE layer 23 are crystallized during the bonding of the positive-electrode body 1 and the negative-electrode body 2, the resultant battery 100 has an excellent battery characteristic, compared with the batteries in Comparative example.

Regarding the conditions for change from amorphous to crystalline in Table I, different conditions result in differences in the resistance of the SE layer 40. For example, comparison between Samples 1 to 6 indicates the following tendency: the closer to 150° C. or 300° C. the heat-treatment temperature is, the higher the resistance of the SE layer 40 becomes. In particular, in Samples 3 and 4 in which the heat-treatment temperatures are between 180° C. to 250° C., the resistance of the SE layer 40 is lower than that in the other Samples 1, 2, 5, and 6. In addition, comparison between Samples 4 and 10 to 12 indicates the following: the longer the heat-treatment time is, the lower the resistance of the SE layer 40 becomes. Comparison between Samples 4 and 7 to 9 indicates the following tendency: the higher the applied pressure is, the lower the resistance of the SE layer 40 becomes.

Test Example 2

Nonaqueous-Electrolyte Batteries in Example 2

In Test example 2, the influence of the C content of the SE layer 40 on the resistance of the SE layer 40 was examined. Specifically, five nonaqueous-electrolyte batteries 100 (Samples 21 to 25) in which the C content of the SE layer 40 was varied were produced; and the resistance ($\Omega \cdot cm^2$) of the SE layer 40 in Samples 21 to 25 was measured.

In order to produce Samples 21 to 25, five source materials having different $Li_2S$—$P_2S_5$ purities were prepared as source materials for forming the PSE layer 13 and the NSE layer 23. In these source materials, the C contents were 0 atomic %, 3 atomic %, 5 atomic %, 10 atomic %, and 12 atomic %. These C contents in the source materials were measured by X-ray photoemission spectroscopy (XPS) analysis.

Except for the difference in the source materials used for forming the PSE layer 13 and the NSE layer 23, in Samples 21 to 25, common materials and production conditions were employed. These common features are listed below.

[Positive-Electrode Body 1]
    positive-electrode collector 11
        Al foil having a thickness of 10 μm
    positive-electrode active-material layer 12
        press-molded body composed of $LiNi_{0.8}Co_{0.15}Al_{0.05}O_2$ (hereafter NCA) powder and $Li_2S$—$P_2S_5$ powder and having a thickness of 200 μm
        NCA particles having an average size of 6 μm
        $Li_2S$—$P_2S_5$ particles having an average size of 2 μm
        NCA:$Li_2S$—$P_2S_5$=70:30 (mass ratio)
        press-molding conditions: in an atmosphere at 200° C. and at a surface pressure of 540 MPa
    PSE layer 13
        amorphous $Li_2S$—$P_2S_5$ film having a thickness of 5 μm (vacuum deposition process)

[Negative-Electrode Body 2]
    negative-electrode collector 21
        Al foil having a thickness of 10 μm
    negative-electrode active-material layer 22
        press-molded body composed of $Li_4Ti_5O_{12}$ (hereafter LTO) powder, $Li_2S$—$P_2S_5$ powder, and acetylene black (hereafter AB) and having a thickness of 200 μm
        LTO particles having an average size of 6 μm
        $Li_2S$—$P_2S_5$ particles having an average size of 2 μm
        LTO:$Li_2S$—$P_2S_5$:AB=40:60:4 (mass ratio)
        press-molding conditions: in an atmosphere at 200° C. and at a surface pressure of 540 MPa
    NSE layer 23
        amorphous $Li_2S$—$P_2S_5$ film having a thickness of 5 μm (vacuum deposition process)

Subsequently, in a dry atmosphere at a dew point of −40° C., the positive-electrode body 1 and the negative-electrode body 2 prepared were arranged such that the SE layers 13 and 23 thereof were in contact with each other and were subjected to a heat treatment while being pressed onto each other. Thus, a plurality of the nonaqueous-electrolyte batteries 100 were produced. The heat-treatment conditions were 190° C.×130 minutes and the pressure-application condition was 16 MPa.

Each of the thus-produced nonaqueous-electrolyte batteries 100 was contained in a coin cell to complete Samples 21 to 25. In each Sample, the C content (atomic %) and resistance ($\Omega \cdot cm^2$) of the SE layer 40 were measured. The C content was measured in the following manner: a section of the SE layer 40 was prepared by processing with a cross-section polisher and the section was subjected to XPS analysis. The resistance was measured in the same manner as in Test example 1. The results are described in Table II below (source materials used are also described). Note that Sample 21 described in the Table as having a C content of "0" was a sample having a C content beyond the detection limit of the measurement device, that is, the sample did not contain C at all or had a C content lower than the detection limit of the measurement device.

TABLE II

| Sample No. | Source material | | SE layer | |
|---|---|---|---|---|
| | Type | C content (atomic %) | C content (atomic %) | Resistance ($\Omega \cdot cm^2$) |
| 21 | $Li_2S$—$P_2S_5$ | 0 | 0 | 20 |
| 22 | $Li_2S$—$P_2S_5$ | 3 | 3 | 22 |
| 23 | $Li_2S$—$P_2S_5$ | 5 | 5 | 24 |
| 24 | $Li_2S$—$P_2S_5$ | 10 | 10 | 30 |
| 25 | $Li_2S$—$P_2S_5$ | 12 | 12 | 50 |

Common bonding conditions: 190° C. × 130 min and 16 MPa

Table II indicates that the C content of the source material used for forming the SE layer 40 is reflected in the C content of the SE layer 40. Comparison between Samples 21 to 24 and Sample 25 also indicates the following: when the C content of the SE layer 40 is 10 atomic % or less, the resistance of the SE layer 40 becomes very low. In addition, comparison between Samples 21 to 24 indicates the following: the lower the C content of the SE layer 40 is, the lower the resistance of the SE layer 40 becomes. Accordingly, the C content of the SE layer 40 is more preferably 5 atomic % or less, still more preferably 3 atomic % or less, most preferably 0 atomic %.

Test Example 3

Nonaqueous-Electrolyte Batteries in Example 3

In Test example 3, the influence of difference in the thicknesses of the PSE layer 13 and the NSE layer 23 on the resistance of the SE layer 40 was examined. Specifically, a plurality of nonaqueous-electrolyte batteries (Samples 31 to 33) in which the thicknesses of the PSE layer 13 and the NSE layer 23 that were amorphous were varied were produced; and the resistance ($\Omega \cdot cm^2$) was measured. Except for the thicknesses of the PSE layer 13 and the NSE layer 23, the other configurations (that is, constituent materials of the layers, conditions for forming the layers, conditions of pressure application and heat treatment during bonding of the electrode bodies, and conditions of the measurement of the resistance) were completely the same as in Sample 21 in Test example 2. The measurement results of the resistance in Samples 31 to 33 and the thicknesses and resistances of the PSE layer 13 and the NSE layer 23 are described in Table III.

TABLE III

| | PSE layer | | NSE layer | | Resistance |
|---|---|---|---|---|---|
| Sample No. | Thickness (μm) | Resistance ($\Omega \cdot cm^2$) | Thickness (μm) | Resistance ($\Omega \cdot cm^2$) | of SE layer ($\Omega \cdot cm^2$) |
| 31 | 2 | 4 | 2 | 4 | 8 |
| 32 | 1 | 2 | 1 | 2 | 4 |
| 33 | 0.5 | 1 | 0.5 | 1 | 2 |

<Summary>

As described in Table III, the resistance of the SE layer 40 was successfully measured in Samples 31 to 33. This indicates that Samples 31 to 33 function as batteries even when the PSE layer 13 and the NSE layer 23 are films having a very small thickness of 2 μm or less. The following has also been indicated: the thinner the SE layer 40 is, the lower the resistance of the SE layer 40 becomes, providing a battery having a small size but a high discharge output.

Test Example 4

Nonaqueous-Electrolyte Batteries in Example 4

In Test example 4, a solid-electrolyte layer having a very small thickness of 2 μm or less was formed in only one of two electrode bodies to be bonded together and the electrode bodies were bonded together by a heat treatment. Thus, nonaqueous-electrolyte batteries 100 (Samples 41 to 44) were produced and the resistance ($\Omega \cdot cm^2$) was measured. Except for the configurations described in Table IV below, that is, the presence or absence of and the thicknesses of the PSE layer 13 and the NSE layer 23, the other configurations were completely the same as in Sample 21 in Test example 2. The measurement results of the resistance in Samples 41 to 44 and the thicknesses and resistances of the PSE layer 13 and the NSE layer 23 are described in Table IV

TABLE IV

| | PSE layer | | NSE layer | | Resistance |
|---|---|---|---|---|---|
| Sample No. | Thickness (μm) | Resistance ($\Omega \cdot cm^2$) | Thickness (μm) | Resistance ($\Omega \cdot cm^2$) | of SE layer ($\Omega \cdot cm^2$) |
| 41 | 2 | 4 | Absence of NSE layer | | 40 |
| 42 | Absence of PSE layer | | 2 | 4 | 40 |
| 43 | 1 | 2 | Absence of NSE layer | | 10 |
| 44 | Absence of PSE layer | | 1 | 2 | 10 |

<Nonaqueous-Electrolyte Battery in Comparative Example 2>

A positive-electrode body having an amorphous PSE layer having a thickness of 10 μm and a negative-electrode body not having a NSE layer were prepared; these electrode bodies were bonded together by a heat treatment under the conditions of Example 4. In this case, the PSE layer served as the SE layer in the nonaqueous-electrolyte battery. In the thus-produced battery, the resistance of the SE layer (=PSE layer) was much higher than the resistances of the SE layers 40 in the batteries 100 in Example 4. This is probably because the contact interface between the SE layer and the negative-electrode body in the battery in Comparative example 2 had a very high resistance. Note that, even when the pressure applied during the heat treatment was more than 160 MPa, no improvement was substantially achieved in the resistance of the SE layer.

<Nonaqueous-Electrolyte Battery in Comparative Example 3>

A positive-electrode body not having a PSE layer and a negative-electrode body having an amorphous NSE layer having a thickness of 10 μm were prepared; these electrode bodies were bonded together by a heat treatment under the conditions of Example 4. In this case, the NSE layer served as the SE layer in the nonaqueous-electrolyte battery. In the thus-produced battery, the resistance of the SE layer (=NSE layer) was much higher than the resistances of the SE layers 40 in the batteries in Example 4. This is probably because the contact interface between the SE layer and the positive-electrode body in the battery in Comparative example 3 had a very high resistance. Note that, even when the pressure applied during the heat treatment was more than 160 MPa, no improvement was substantially achieved in the resistance of the SE layer.

<Summary>

The results of the nonaqueous-electrolyte batteries in Example 4 and Comparative examples 2 and 3 described above indicate the following: when a solid-electrolyte layer is formed for only one of the electrode bodies, the solid-electrolyte layer needs to have a thickness of 2 μm or less.

The present invention is not limited by the above-described embodiments at all. That is, the configurations of the nonaqueous-electrolyte batteries described in the above-described embodiments can be properly modified without departing from the spirit and scope of the present invention.

INDUSTRIAL APPLICABILITY

A method for producing a nonaqueous-electrolyte battery according to the present invention can be suitably used for the production of a nonaqueous-electrolyte battery used as a power supply of an electric device that is intended to be repeatedly charged and discharged.

REFERENCE SIGNS LIST 100 nonaqueous-electrolyte battery
1, 3, 5 positive-electrode body
11 positive-electrode collector
12 positive-electrode active-material layer
13 positive-electrode-side solid-electrolyte layer (PSE layer)
2, 4, 6 negative-electrode body
21 negative-electrode collector
22 negative-electrode active-material layer
23 negative-electrode-side solid-electrolyte layer (NSE layer)
40 sulfide-solid-electrolyte layer (SE layer)

The invention claimed is:

1. A method for producing a nonaqueous-electrolyte battery including a positive-electrode active-material layer, a negative-electrode active-material layer, and a sulfide-solid-electrolyte layer disposed between these active-material layers, the method comprising:
a step of preparing a positive-electrode body including a positive-electrode active-material layer including a powder-molded body, and a positive-electrode-side solid-electrolyte layer that is amorphous and formed on the positive-electrode active-material layer by a vapor-phase process;
a step of preparing a negative-electrode body including a negative-electrode active-material layer including a powder-molded body, and a negative-electrode-side solid-electrolyte layer that is amorphous and formed on the negative-electrode active-material layer by a vapor-phase process; and
a step of bonding together the positive-electrode body and the negative-electrode body by subjecting the electrode bodies being arranged such that the solid-electrolyte layers of the electrode bodies are in contact with each other, to a heat treatment under application of a pressure to crystallize the positive-electrode-side solid-electrolyte layer and the negative-electrode-side solid-electrolyte layer.

2. A method for producing a nonaqueous-electrolyte battery including a positive-electrode active-material layer, a negative-electrode active-material layer, and a sulfide-solid-electrolyte layer disposed between these active-material layers, the method comprising:
a step of preparing a positive-electrode body including a positive-electrode active-material layer including a powder-molded body, and a positive-electrode-side solid-electrolyte layer that is amorphous, has a thickness of 2 μm or less, and is formed on the positive-electrode active-material layer by a vapor-phase process;
a step of preparing a negative-electrode body including a negative-electrode active-material layer including a powder-molded body; and
a step of bonding together the positive-electrode body and the negative-electrode body by subjecting the electrode bodies being arranged such that the positive-electrode-side solid-electrolyte layer and the negative-electrode active-material layer are in contact with each other, to a heat treatment under application of a pressure to crystallize the positive-electrode-side solid-electrolyte layer.

3. A method for producing a nonaqueous-electrolyte battery including a positive-electrode active-material layer, a negative-electrode active-material layer, and a sulfide-solid-electrolyte layer disposed between these active-material layers, the method comprising:
a step of preparing a positive-electrode body including a positive-electrode active-material layer including a powder-molded body;
a step of preparing a negative-electrode body including a negative-electrode active-material layer including a powder-molded body, and a negative-electrode-side solid-electrolyte layer that is amorphous, has a thickness of 2 μm or less, and is formed on the negative-electrode active-material layer by a vapor-phase process; and
a step of bonding together the positive-electrode body and the negative-electrode body by subjecting the electrode bodies being arranged such that the positive-electrode active-material layer and the negative-electrode-side solid-electrolyte layer are in contact with each other, to a heat treatment under application of a pressure to crystallize the negative-electrode-side solid-electrolyte layer.

4. The method for producing a nonaqueous-electrolyte battery according to claim 1, wherein the heat treatment is performed at 130° C. to 300° C. for 1 to 1200 minutes.

5. The method for producing a nonaqueous-electrolyte battery according to claim 4, wherein the pressure applied is 160 MPa or less.

6. The method for producing a nonaqueous-electrolyte battery according to claim 1, wherein the solid-electrolyte layer formed on the active-material layers has a C content of 10 atomic % or less.

7. The method for producing a nonaqueous-electrolyte battery according to claim 4, wherein the solid-electrolyte layer formed on the active-material layers has a C content of 10 atomic % or less.

8. The method for producing a nonaqueous-electrolyte battery according to claim 5, wherein the solid-electrolyte layer formed on the active-material layers has a C content of 10 atomic % or less.

9. A nonaqueous-electrolyte battery comprising a positive-electrode active-material layer, a negative-electrode active-material layer, and a sulfide-solid-electrolyte layer disposed between these active-material layers,
wherein the positive-electrode active-material layer and the negative-electrode active-material layer each include a powder-molded body, the solid-electrolyte layer is a crystalline integrated layer formed by bonding together a positive-electrode-side solid-electrolyte layer disposed on a side of the positive-electrode active-material layer and a negative-electrode-side solid-electrolyte layer disposed on a side of the negative-electrode active-material layer, and the solid-electrolyte layer has a resistance of 50 $\Omega \cdot cm^2$ or less.

10. A nonaqueous-electrolyte battery comprising a positive-electrode active-material layer, a negative-electrode active-material layer, and a sulfide-solid-electrolyte layer disposed between these active-material layers, wherein the positive-electrode active-material layer and the negative-electrode active-material layer each include a powder-molded body, the solid-electrolyte layer is a crystalline layer having a thickness of 2 μm or less, and the solid-electrolyte layer has a resistance of 50 $\Omega \cdot cm^2$ or less.

11. The nonaqueous-electrolyte battery according to claim 9, wherein the solid-electrolyte layer has a C content of 10 atomic % or less.

12. The nonaqueous-electrolyte battery according to claim 9, wherein the positive-electrode active-material layer contains an active material containing an oxide containing Li and at least one metal selected from Co, Mn, Ni, Fe, and Al, and a solid electrolyte containing $Li_2S—P_2S_5$.

13. The nonaqueous-electrolyte battery according to claim 9, wherein the negative-electrode active-material layer contains an active material containing at least one element selected from C, Si, Ge, Sn, Al, and Li, or an active material containing an oxide at least containing Ti and Li, and a solid electrolyte containing $Li_2S—P_2S_5$.

14. The method for producing a nonaqueous-electrolyte battery according to claim 2, wherein the heat treatment is performed at 130° C. to 300° C. for 1 to 1200 minutes.

15. The method for producing a nonaqueous-electrolyte battery according to claim 14, wherein the pressure applied is 160 MPa or less.

16. The method for producing a nonaqueous-electrolyte battery according to claim 2, wherein the solid-electrolyte layer formed on the active-material layers has a C content of 10 atomic % or less.

17. The method for producing a nonaqueous-electrolyte battery according to claim 3, wherein the heat treatment is performed at 130° C. to 300° C. for 1 to 1200 minutes.

18. The method for producing a nonaqueous-electrolyte battery according to claim 17, wherein the pressure applied is 160 MPa or less.

19. The method for producing a nonaqueous-electrolyte battery according to claim 3, wherein the solid-electrolyte layer formed on the active-material layers has a C content of 10 atomic % or less.

20. The nonaqueous-electrolyte battery according to claim 10, wherein the solid-electrolyte layer has a C content of 10 atomic % or less.

21. The nonaqueous-electrolyte battery according to claim 10, wherein the positive-electrode active-material layer contains an active material containing an oxide containing Li and at least one metal selected from Co, Mn, Ni, Fe, and Al, and a solid electrolyte containing $Li_2S—P_2S_5$.

22. The nonaqueous-electrolyte battery according to claim 10, wherein the negative-electrode active-material layer contains an active material containing at least one element selected from C, Si, Ge, Sn, Al, and Li, or an active material containing an oxide at least containing Ti and Li, and a solid electrolyte containing $Li_2S—P_2S_5$.

* * * * *